(No Model.) 2 Sheets—Sheet 1.
C. C. WOLCOTT.
FIBER DRIER AND CLEANER.
No. 581,096. Patented Apr. 20, 1897.
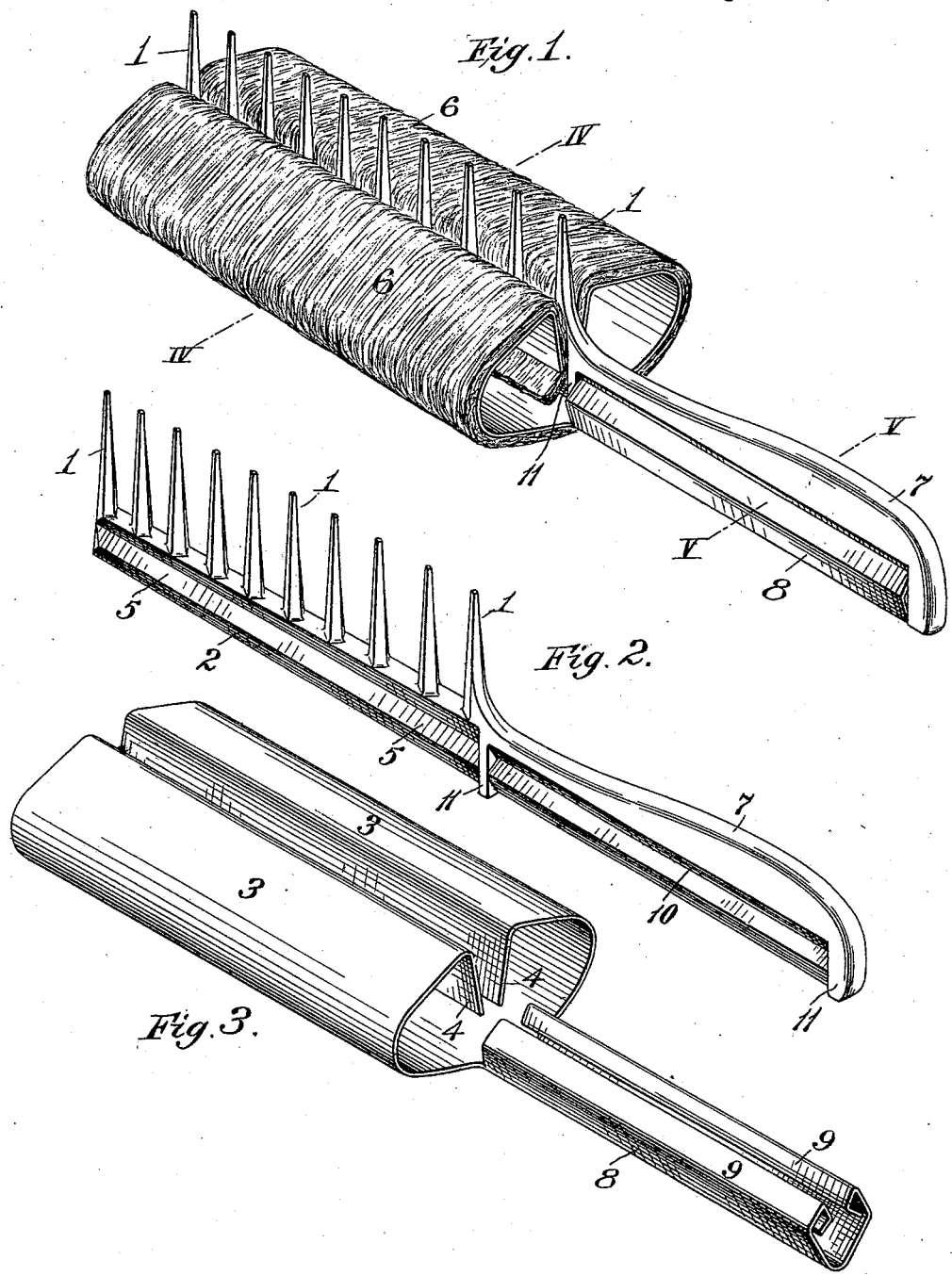
WITNESSES:
INVENTOR (No Model.) 2 Sheets—Sheet 2.

C. C. WOLCOTT.
FIBER DRIER AND CLEANER.

No. 581,096. Patented Apr. 20, 1897.

WITNESSES:
C. H. Umstead
Jno. C. Munchen

INVENTOR
Christopher C. Wolcott

UNITED STATES PATENT OFFICE.

CHRISTOPHER C. WOLCOTT, OF PHILADELPHIA, PENNSYLVANIA.

FIBER DRIER AND CLEANER.

SPECIFICATION forming part of Letters Patent No. 581,096, dated April 20, 1897.

Application filed December 17, 1896. Serial No. 616,090. (No model.)

*To all whom it may concern:*

Be it known that I, CHRISTOPHER C. WOLCOTT, a citizen of the United States, residing at Philadelphia, in the county of Philadelphia and State of Pennsylvania, have invented or discovered certain new and useful Improvements in Fiber Driers and Cleaners, of which improvements the following is a specification.

The invention described herein has for its object the separation of fibrous materials, such as hair or wool, into strands, and the simultaneous drying and cleansing of such material, the separation of the fibers into strands facilitating the drying and cleaning operations.

The invention is hereinafter more fully described and claimed.

Figure 4:
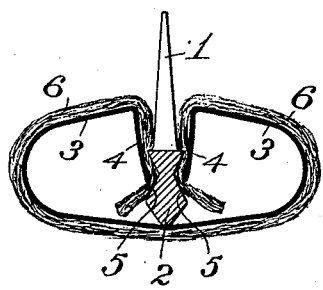
Figure 5:
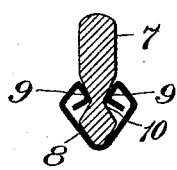
Figure 6:
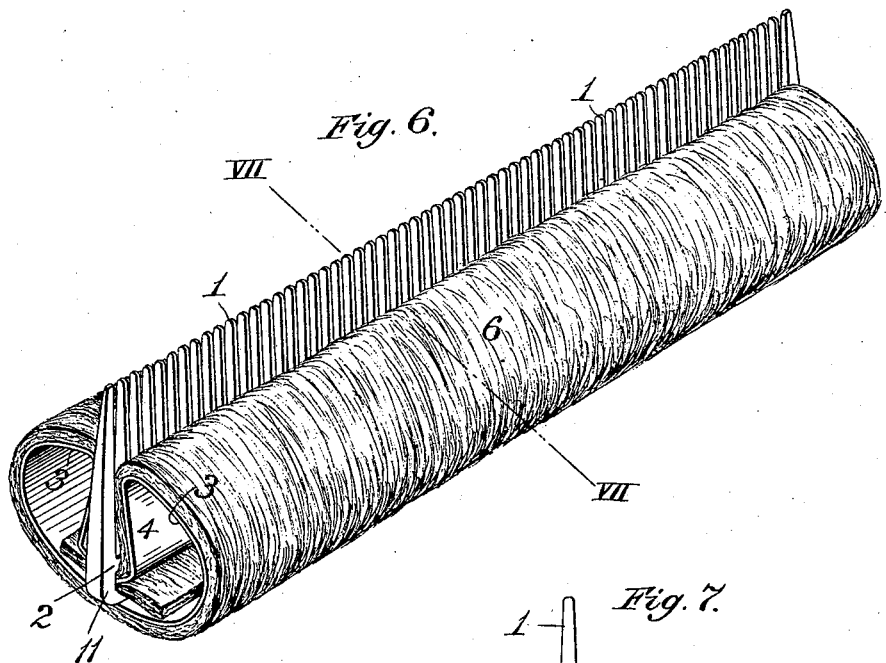
Figure 7:
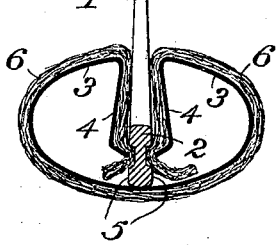

In the accompanying drawings, forming a part of this specification, Figure 1 is a perspective view of an arrangement of separator and drier or cleaner. Figs. 2 and 3 are perspective views of the separator and the support or holder for the drier and cleaner. Figs. 4 and 5 are transverse sections, the planes of sections being respectively indicated by the lines IV IV, Fig. 1. Fig. 6 is a perspective view of a modified form or construction; and Fig. 7 is a transverse section, the plane of section being indicated by the line VII VII, Fig. 6.

In the practice of my invention the fibers to be treated are drawn over a series of teeth or pins 1, which are held in proper relation to each other in any suitable manner, as, for example, by being formed integral with a bar or back piece 2.

In order to dry or cleanse the fibers, they are drawn over a suitable absorbent material, such as prepared cotton, paper, or other suitable material which will take up and retain the moisture, grease, &c., on the fibers. As the operation of stranding the fibers opens them up and thereby facilitates the extraction of the moisture, grease, &c., it is preferred to arrange the separator and absorbent in such relation to each other that the fibers will be brought into operative relation to the absorbent material by their movement over or through the separator.

A convenient means of holding the absorbent material in the desired relation to the separator consists of a frame formed of metal or other suitable material, having portions 3, which will support the absorbent on opposite sides of the separator. The absorbent material 6 may be attached to the frame and the latter to the separator in any convenient manner, such, for example, as that shown in the drawings. This means consists in providing the inner edges of the supporting portions of the frame with resilient flanges 4, so constructed that when the separator is pushed in between the flanges the edges of the latter will spring in over shoulders or ridges 5, formed along the sides of the teeth-supporting bar 2, as shown in Fig. 4, thereby holding the frame and separator in proper relation to each other. This construction also affords a convenient means for holding the absorbent material on the frame, as by wrapping the material around the frame and folding the ends around the edges of the flanges 4 the material will be tightly clamped between the edges of the flanges and the ridges or shoulders 5, as shown in Figs. 1, 4, and 6; and, further, as the bar 2 is forced down between the flanges the material will be drawn tightly around the frame.

As shown in Figs. 1 and 2, the separator may be formed with a handle 7, and the frame may be formed with an extension 8, which when the frame and separator are fastened together will lie closely against the handle. When this extension is used, it is preferred that it should be clamped to the handle, thereby forming an additional connection between the separator and handle. To this end the extension is formed with ribs 9, which are adapted to spring into grooves 10 along the sides of the handle, as shown in Figs. 1 and 5. In order to prevent the longitudinal separation of the frame and separator, the latter is provided with shoulders or stops 11, which in the construction shown in Figs. 1, 2, and 3 are formed on the handle at the ends of the groove 10, so that the ends of the ribs 9 will bear against them and prevent any longitudinal movement of the frame and separator relative to each other.

As shown in Fig. 6, the separator may be formed without a handle, and in such case the stops 11, whereby the separator is held from longitudinal movement, are formed at the ends of the ridges or shoulders on the bars 2.

I claim herein as my invention—

1. As an improvement in means for treating fibers, the combination of a fiber-separator and an absorbent material arranged in the path of movement of the fibers over or through the separator, substantially as set forth.

2. The combination of a series of teeth, and an absorbent material arranged alongside of the teeth, whereby the fibers may be simultaneously separated into strands, and subjected to the action of the absorbent material, substantially as set forth.

3. The combination of a fiber-separator, a frame, an absorbent material supported by the frame and means for securing the frame and separator together, substantially as set forth.

4. The combination of a fiber-separator, a frame adapted to support an absorbent material in proper relation to the separator and means for detachably securing the frame to the separator, substantially as set forth.

5. The combination of a bar provided with a series of teeth and having longitudinal ribs or shoulders and a frame adapted to support an absorbent material and provided with oppositely-acting resilient flanges adapted to engage the ribs or shoulders on the bar, substantially as set forth.

6. The combination of a toothed bar provided with a handle, the handle and bar having longitudinal ribs or shoulders, a frame adapted to support an absorbent material and provided with oppositely-resilient flanges and an extension of the frame provided with oppositely-acting resilient ribs, the flanges and ribs adapted to engage the longitudinal ribs or shoulders on the bar and handle, substantially as set forth.

CHRISTOPHER C. WOLCOTT.

Witnesses:
JNO. C. MUNCHEN,
A. O'MALLEY.